United States Patent
DuBois et al.

(10) Patent No.: US 7,369,999 B2
(45) Date of Patent: May 6, 2008

(54) SYSTEMS AND METHODS FOR USA PATRIOT ACT COMPLIANCE

(75) Inventors: Dan DuBois, Orefield, PA (US); Kristin Hlavinka, Macungie, PA (US); Matt Matulewicz, Easton, PA (US); Michael Caskin, Washington, DC (US); Raymond J. Lauer, Phillipsburg, NJ (US)

(73) Assignee: Dun and Bradstreet, Inc., Short Hills, NJ (US)

( * ) Notice: Subject to any disclaimer, the term of this patent is extended or adjusted under 35 U.S.C. 154(b) by 580 days.

(21) Appl. No.: 10/874,739

(22) Filed: Jun. 23, 2004

(65) Prior Publication Data

US 2005/0288941 A1    Dec. 29, 2005

(51) Int. Cl.
    *G06Q 99/00* (2006.01)
(52) U.S. Cl. .......................................................... 705/1
(58) Field of Classification Search ...................... 705/1
    See application file for complete search history.

(56) References Cited

U.S. PATENT DOCUMENTS

| | | | |
|---|---|---|---|
| 2002/0041700 A1 | 4/2002 | Therbaud | 382/124 |
| 2002/0138417 A1 | 9/2002 | Lawrence | 705/38 |
| 2004/0024694 A1 | 2/2004 | Lawrence et al. | 705/38 |
| 2004/0030649 A1 | 2/2004 | Nelson et al. | 705/44 |
| 2004/0078321 A1 | 4/2004 | Lawrence | 705/38 |
| 2004/0117316 A1 | 6/2004 | Gillum | 705/64 |
| 2005/0273430 A1 | 12/2005 | Pliha | 705/42 |

OTHER PUBLICATIONS

Vastera-Solutions for Global Trade (www.vastera.com/) pp. 1-2, Vastera—Global Trade Strategy—Import and Export Trade Management.

Vastera-Export Restricted Party Screening (www.vastera.com/ts-export-screening.asp) pp. 1-2, Vastera—Solutions for Global Trade.

International Search Report and Written Opinion dated Dec. 8, 2006 based on PCT application No. PCT/US05/22431.

*Primary Examiner*—Jamisue Plucinski
(74) *Attorney, Agent, or Firm*—Ohlandt, Greeley, Ruggiero & Perle (57) ABSTRACT

In preferred embodiments, the present invention includes computer-implemented methods and computer systems for know-your-customer risk assessment that assemble a plurality of data elements descriptive of the risk characteristics of a designated customer, wherein at least one data element is descriptive or risk characteristics determined by a government, weigh a selected plurality of the assembled data elements relative to the risk indicated by the determined data element values, and combine the weighted data elements into one or more indices representative of the know-your-customer risk of the designated customer. The present invention also includes computer readable media with computer code for performing these methods.

18 Claims, 5 Drawing Sheets

SYSTEMS AND METHODS FOR USA PATRIOT ACT COMPLIANCE

1. FIELD OF THE INVENTION

The present invention includes systems and methods that provide tools for complying with the obligations of the USA Patriot Act (USAPA), in particular the obligations of financial institution to carry out a duly diligent investigation of new customers.

2. BACKGROUND OF THE INVENTION

The USA Patriot Act (USAPA) was passed Oct. 26, 2001 immediately following the events of Sep. 11, 2001. The aim of the Act is to combat the threat of terrorist organizations by preventing organizations that assist or carry out terrorist acts from conducting business in the United States and by identifying any attempts to do so.

In particular, Sec. 326 of the Act outlines new requirements for financial institutions to positively identify their potential customers. These requirements include:
  establishing a risk based approach to customer identification;
  confirming the identity of new customers;
  screen against government control lists;
  maintaining audit trails of the execution of these requirements.

The U.S. Treasury Department has mandated that all Financial Institutions process due diligence on all new commercial customers within a reasonable period of time following account opening". The financial institution must maintain an audit trail that this due diligence was completed.

The prior art appears to provide little assistance in meeting these new regulatory requirements. For example, U.S. 2004/0030649 A1 (Feb. 12, 2004) describes a system and method for processing applications for loans, credit, and the like. Although this publication describes that it is desirable to check for USAPA compliance risk, it provides no teaching concerning how USAPA compliance risk is to be assessed. U.S. 2004/0078321 A1 (Apr. 22, 2004) describes a system and method for providing a clearing house of customer risk information, including USAPA compliance risk. However, this publication also does not teach how USAPA compliance risk is to be assessed.

Citation or identification of any reference in this section or any section of this application shall not be construed that such reference is available as prior art to the present invention.

3. SUMMARY OF THE INVENTION

The objects of the present invention are to overcome these deficiencies in the prior art by providing quantitatively-based tools that assist persons or organizations, particularly financial organizations, in complying with the requirements of the USAPA and similar statutes, regulations, and policies, whether governmental or non-governmental, of a risk based approach for customer identification. In particular, the tools provided to an organization include metrics that assess or estimate a potential customer's or business partner's identity and legitimacy.

In particular, one preferred metric, the proof of right count (POR count), represents the degree to which a potential customer's identity has been determined and corroborated. Another preferred metric, the compliance risk index (CR index), represents an overall estimate of the legitimacy or illegitimacy of a potential customer, that is the degree to which a potential customer may be a USAPA compliance risk. Briefly, the CR risk metric provides organizations subject to the USAPA with a further tool for performing compliance risk based assessment of trading partners. The index is a numeric value that represents presence or absence (and value) of a range of data elements that reflect greater or lesser compliance risk. Parties with higher CR risk metric values are those having a larger number of the risk-suggesting attributes and are likely to represent an increased compliance exposure, relative to those parties with lower CR risk metric values. And finally a third preferred metric, the compliance risk class (CR class), provides an overall indication that a potential customer is likely to be, or likely not to be, a USAPA compliance risk These metrics are determined by considering, weighing, and aggregating a range of data describing attributes of potential customers or business partners. Examples of the attributes considered in determining the CR index includes:
  industry classification,
  length of time under present management,
  size of entity,
  presence of corroboration of existence,
  level of historical trading activity,
  location of the entity and of the key members of commercial family tree,
  presence of potentially derogatory events (i.e. criminal indictment),
  business status of entity, and the like.

Values of these attributes are weighed so that entities with higher CR indices are more likely to represent an increased compliance risk than entities with lower CR indices. The currently preferred embodiment of the weighting and aggregating is based on a linear, or mixed linear and logistic, discriminant function having initially determined discriminant function coefficients (or weights). Further embodiments, include refining the discriminant function weights in view of observed results by methods known in the art, and also the use of other known statistical classification and pattern recognition methods where observed results indicate that inadequacy of such linear discriminant functions.

These metrics are implemented by computer programs executed on computer systems of this invention. These systems include components which receive user requests for customer identification and provide responses to the uses. Requests and response are preferably handled both as individual screen-oriented online transactions and as batches (or files) with multiple user requests and reports containing the results of request batches. Also because the range of data needed by these metrics and programs is not currently available from any single information service, this invention's systems also include components interfacing with and requesting data from a number of information services. Finally, this invention includes both computer-readable media with the implementing computer programs and systems for executing these programs.

In more detail, the present invention includes computer-implemented methods and computer systems for know-your-customer risk assessment that assemble a plurality of data elements descriptive of the risk characteristics of a designated customer, wherein at least one data element is descriptive or risk characteristics determined by a government, weigh a selected plurality of the assembled data elements relative to the risk indicated by the determined data element values, and combine the weighted data elements into one or more indices representative of the know-your-customer risk of the designated customer. The present invention also includes computer readable media with computer code for performing these methods.

In preferred embodiments, the methods and systems of the present invention 19 assign numerical weights in dependence on the values of a plurality of the data elements, and combine the assigned weights by adding the assigned values; further at least one weight is assigned in dependence on the designated customer activity being in an identified higher risk industry, and at least one weight is assigned in dependence on a location associated with the designated customer being on a list established by a government of higher risk countries, and at least one data element indicating the presence or absence of the designated customer on a list established by a government of higher risk entities. In further preferred embodiments, the determined indices include at least one index is representative of the certainty of identification of the designated customer, and preferably increases as the number of data elements with values requiring positive identification of the designated customer increases; and also include at least one index representative of overall risk of the designated customer, wherein the overall risk is determined by combining a majority of the weighted, assembled data elements. In most preferred embodiments the data elements assembled and their relative weightings are selected so that the determined risk indices are representative of U.S. Patriot Act compliance risk.

The references cited or identifies in this section are incorporated in their entireties by reference herein for all purposes. Their citation or identification, or the citation, identification, or incorporation of additional references in any section of this application, shall not be construed that such references are available as prior art to the present invention.

4. BRIEF DESCRIPTION OF THE DRAWINGS

The present invention may be understood more fully by reference to the following detailed description of the preferred embodiment of the present invention, illustrative examples of specific embodiments of the invention and the appended figures in which.

5. DETAILED DESCRIPTION OF THE PREFERRED EMBODIMENTS

This section describes preferred embodiments of the systems and methods of this invention. Although this invention is described with respect to USAPA compliance, this is not limiting because one of ordinary skill in the art will understand from the following description how to apply this invention to similar statutes, regulations, and policies, whether governmental or non-governmental (known collectively as know-your-customer regulations). It will be seen that by selecting appropriate data elements and weights, in the case of discrminant function embodiments, that the risk metrics determined may be directed to other similar risks.

Figure 1:
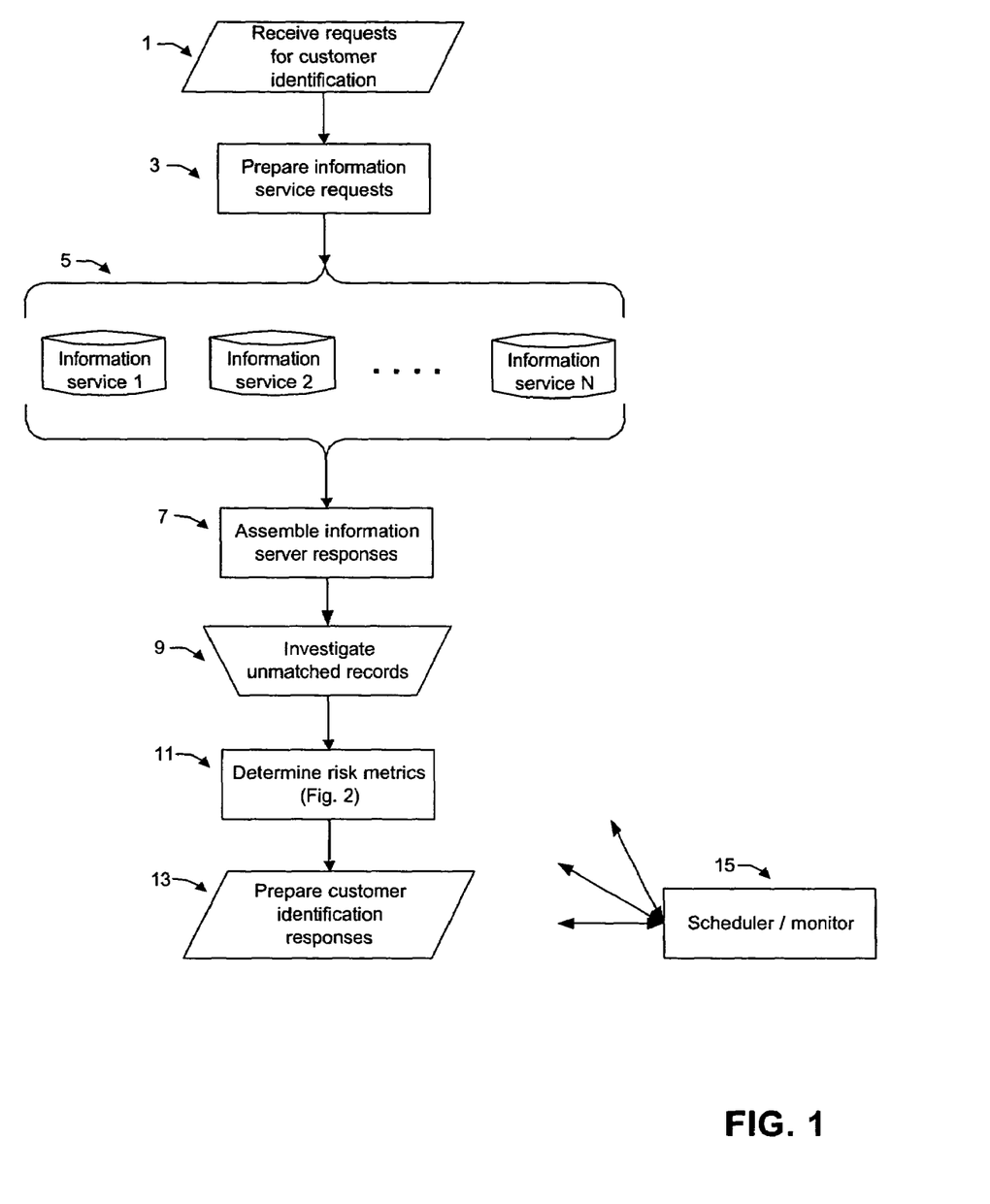
FIG. 1 illustrates methods of this invention.

FIG. 1 generally illustrates methods of this invention suitable for both transaction and batch environments. In view of the following description, one of skill in the art would be able to tailor this general preferred embodiment to the particular needs of transaction-only or batch-only environments. However, risk metrics should be calculated in all environments in a substantially similar, standard (but not necessarily identical) manner in all environments.

The methods begin with receipt 1 of user requests for identification of potential customers or business partners (hereinafter, collectively "parties"). User requests may be provided as transactions entered at local user computers or terminals and typically seeking identification of one or at most a few parties. In this case, the transaction requests and transaction response resulting at step 13 are transmitted to the server systems of this invention preferably using an online communication system. Alternatively, multiple user requests may be grouped into batches seeking identification of perhaps thousands of parties. Each batch of requests is typically assembled into a file, and the file transferred by known secured file transfer protocols, preferably the Internet FTP protocol, preferably secured. The responses are also preferably grouped into one or reports files and returned to the user at step 13, perhaps as report files by secured FTP.

After receipt, requests, both transaction and batch, are processed through steps 3-11. For request transactions, these steps may be implemented as a single transaction on transaction server systems, or alternatively, as separate sub-transactions whose overall sequencing and processing is organized by, for example, transaction monitor 15, as known in the art. For request batches, related portions of this processing are preferably organized as batch jobs on batch server systems. Then, job monitor or scheduler 15 routes processing jobs, perhaps by FTP, between server systems, invokes processing jobs, and monitors their results.

Processing steps 3-11, especially determining the preferred risk metrics, depend on and reflect a wide range of party attributes. Accordingly, major categories of these attributes currently preferred are next described along with exemplary current information services that supply such data. One important information category concerns characteristics of commercial parties, such as their location(s), management, ownership structure, business(es) engaged in, occurrence of important commercial events (mergers and acquisitions, bankruptcy, litigation, and the like). Another important information category concerns the characteristics of individuals, such as name(s), address(es), government issued identification(s) and license(s) (social security number, drivers and other licenses, and the like), important events (family status, criminal activities, bankruptcy or other commercial litigation, and the like). A further important information category concerns what are known as government control lists (GCL) maintained by the U.S. government and other governments throughout the world. Briefly, GCLs list those parties (individual and commercial) that governments have found to be carrying out (or found likely to be carrying out) improper activities. Many of activities considered improper by various governments, such as money laundering, drug dealing, arms trafficking, terrorist activity, and the like, are relevant to USAPA compliance. It is key that these lists be consulted. Finally, these current categories are not limiting, and other categories and characteristics may be found useful for determining risk metrics in the future.

Information bearing on this broad range of party characteristics is not currently available from any single information service. Thus, the presently preferred embodiment of this invention obtains this data from a plurality of information sources 5. Dun & Bradstreet (http://www.dnb.com/us/; last visited May 27, 2004) is the information service preferred for data concerning commercial entities. Dun & Bradstreet provides information services with cross-checked and corroborated data concerning identity, structure, activities, and the like of for millions of commercial parties worldwide. In particular, Dun & Bradstreet uses a numbering system (data universal numbering system or DUNS) to uniquely identify the establishment sites of parties. The DUNS number, where available, is preferably used by the methods of this invention for commercial identification. For individuals, Acxiom Corp. (http://www.acxiom.com/, last visited May 27, 2004) is a preferred information service providing verified data about identity(s), criminal records, credit rating, driving history, employment background, education credentials, and the like. For GCLs, Vastera, Inc. (http://www.vastera.com; last visited May 27, 2004) provides a screening service which screens parties against numerous worldwide government control lists. Less preferred is direct access to the these GCLs. For example, the Bureau of Industry and Security of the U.S. Department of Commerce (http://www.bxa.doc.gov/index.htm; last visited May 27, 2004) maintains information on control lists related to export/import activities. Finally, additional information sources may be consulted to data on other relevant party characteristics, and other information sources may from time-to-time add to, supplement, or replace these currently preferred sources.

Returning now to FIG. 1, after user (transaction or batch) requests have been received 1, their information is extracted, re-assembled and forwarded 3 as separate requests to information sources 5 used in an embodiment of this invention. Because different information sources have different specialties, different types of requests are directed to different information sources. Thus, requests relating to business organizations of all types are preferably separated from requests related to individuals, where the individuals may be direct customers or partners of a user, or they may be the principals or signatories representing a business organization. Also, requests and signatory/individual requests may themselves be divided into U.S. and non-U.S. or into other jurisdictional division. Finally, as already described, requests for certain types of information are directed only to information providing the information, Preferred identification fields for business organizations include: business name, address line 1, city, state/province (for U.S. and Canadian records), physical country (for non us records), and account number. Optional fields that are used if provided include: secondary business name, postal code, mailing address line 1, mailing address line 2, mailing city, mailing state, mailing country, mailing postal code, main business telephone number, tax identification number, account number, and optional fields such as business unit id, secondary business unit id, bank number, branch number, and the like.

Preferred identification fields for signatories/customers include: signatory unparsed name, home telephone number, drivers license state, drivers license number. Optional fields that are used if provided include: customer identifier 1 (for example as defined in Dun & Bradstreet profile), customer identifier 2, signatory first name, signatory last name, signatory unparsed name, residential address line 1, residential address line 2, residential city, residential state, residential country, residential postal code, mailing address line 1, mailing address line 2, mailing city, mailing state, mailing country, mailing postal code, home telephone number, date of birth, social security number and/or tax identification number, drivers license state, drivers license number, account number, and optional fields such as business unit id, secondary business unit id, bank number, branch number The prepared information service requests 3 are then presented 5 to the various information services as individual request transactions, as batches of requests, or in other prescribed formats and manners. Batch presentation is preferable. Here, a number of service requests are gathered into a batch files and the file is transmitted to the information services by, for example, FTP. Responses from the information services may be received as individual transactions, as batches, or in other prescribed manners. In the batch environment, information service responses are gathered into a batch file and the file is transmitted to the server systems of this invention by, for example, FTP. After responses are received, their information is extracted from the format provided by the information services, and reassembled 7 for subsequence processing. At least, it is preferred that are information for each particular entity by assembled stored together (or stored for easily retrieval) in a format convenient for subsequent processing.

As a result, in most cases the data necessary to evaluate the risk metrics of this invention is now readily available. However, certain commercial or individual entities may be identified of matched by any information service, or the matches returned may be too contradictory for routine processing. Should this happen, this invention provides a more or less manual step 9 where such unmatched or suspicious entities can be more or less manually investigated. For example, individual quality control personnel can manually interrogate information sources or make inquiries from knowledgeable sources to determine meaningful information.

Figure 2:
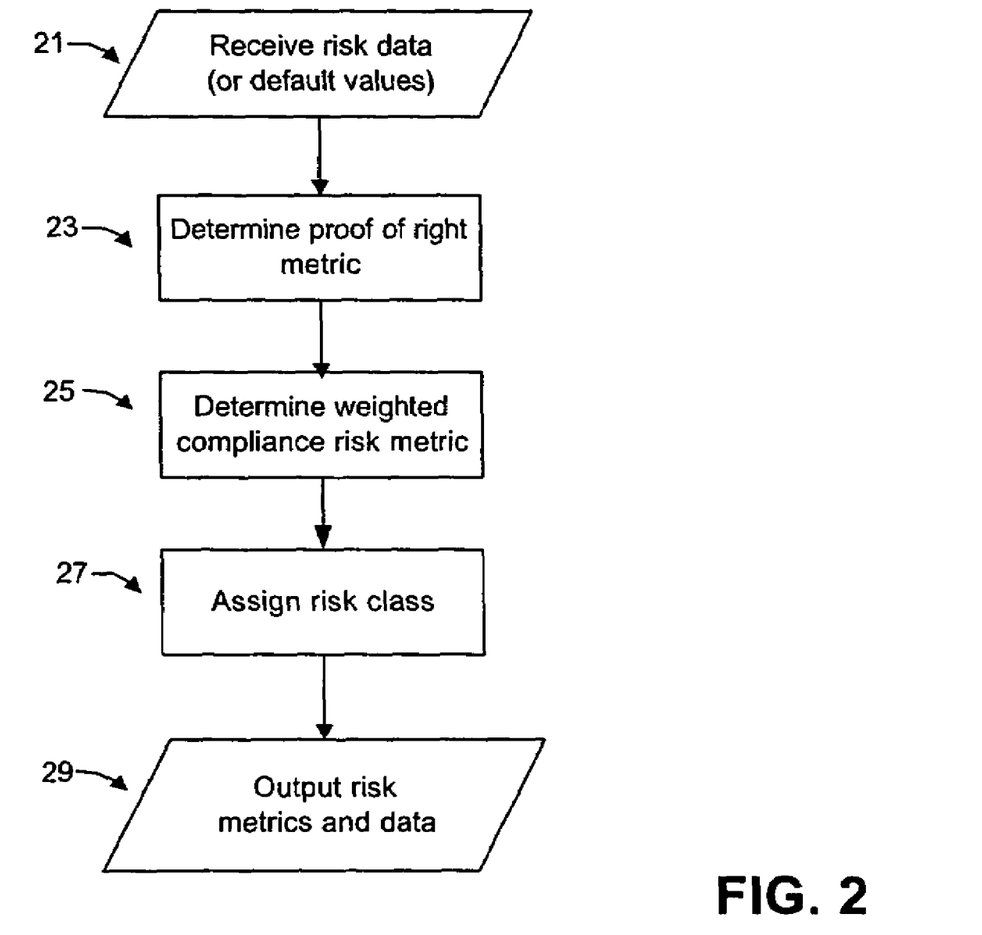
FIG. 2 illustrates determining risk metrics of this invention.

Next, at least for those parties for which sufficient data has bee gathered, the data from the information services is gathered, the risk and compliance metrics are determined 11. FIG. 2 illustrates this process in more detail for each party. Starting with sufficient party risk data 21, first, the proof or right (POR) metric is determined 23. This metric is designed to represent the degree to which a potential customer's identity has been determined and corroborated, and preferably reflects the number of independent data elements whose retrieval requires that a party's identity be corroborated. For example, data reflecting that a particular party has been involved in a legal action requires that the party's identity match one of the participants in the legal action. This is an independent identity corroboration which thus increases the likelihood that the particular party has been correctly identified. Similarly, other data require similar independent identity corroboration. Currently, the POR is simply a sum determined by the following steps:

Set POR to 0;

If incorporation year data is present, then add 1 to the POR;

If total trade payment data is present and is greater than 1, then add 1 to the POR;

If positive financial embarrassment data is, then add 1 to the POR;

If positive secured filings indicator data is present, then add 1 to the POR;

If positive suits/judgments indicator is present, then add 1 to the POR;

If positive claims indicator is present, then add 1 to the POR;

If positive 8(*a*) firms indicator is present, then add 1 to the POR;

If debarments count is present and greater than 1, then add 1 to the POR.

Thus in this embodiment, the POR is between 0 and 8. In further embodiments, POR determination can be supplemented as more data elements requiring independent identity corroboration become available. Alternatively, identity corroboration that are more reliable may be assigned a higher weight than corroboration that are less reliable. Alternatively, the POR may be a non-linear function (with monotonically decreasing slope) of the number and/or significance of the available independent identity corroboration.

Using the POR, the compliance risk (CR) metric is then determined 25 by a method that depends on a linear discriminant function of the presence and/or absence and/or value of data elements that reflect greater or lesser compliance risk. Data elements not retrieved for a particular party request are preferably assigned default values for input to the discriminant function. The discriminant function is defined by weights that are assigned to the various data elements that are chosen so that the CR risk index (and class) assess or estimate a parties USAPA compliance risk. It should be noted that in the absence of a sufficiently numerous sample of illegitimate entities, for example, drug dealers, money launders, terrorists, and the like, and their characteristics, these estimates cannot be statistically validated. If and when such a sample becomes available, this invention further contemplates statistical validation and adjustment of CR index and class determinations.

In the preferred embodiment of the CR metric relevant data elements are assigned to three different weight classes, a low weight class with low weights, an intermediate weight class with intermediate weights, and a high weight class with high weights. Generally, the high weights are two to four time the intermediate weights, and the intermediate weights are two to four time the low weights (a type of exponential scale). For concreteness in the following (especially in Sec. 6.1) and without limitation, low weights are taken to be between 1 and 5; intermediate weights and taken to be between 10 and 20; and high weights are taken to be between 50 and 75. It will the apparent to one of average skill that this absolute scale of these weights may be altered while preserving their relative magnitudes without changing the nature of the present invention.

Currently, data elements in the low weight class include: total employees, employees at site, incorporation year, site ownership, import indicator, export indicator, high credit, statement date, PAYDEX score, average credit, secured filings indicator (UCC indicator), suits/judgments indicator, and claims indicator (such as liens).

Data elements in the intermediate weight class include: the POR, annual sales volume, history indicator, primary SIC, local activity code, control year, total trade payments, financial embarrassment indicator, other special event, operating special event, disaster special event, financial/legal and special events.

And, data elements in the high weight class include: physical country, criminal activity, debarments count, headquarter country code, parent country code, domestic ultimate country code, global ultimate country code, out-of-business indicator, and the severe risk indicator.

The certain data element have values used in the discriminant function that are determined from subsidiary data tables: currently, a U.S. list of sanctioned and non-cooperating countries and a list of high risk industries. Certain countries, listed in Sec. 6.2, have been identified and sanctioned by the U.S. for several reasons. The countries in which the current entity resides, in which the parent entity resides, in which the entities' headquarters reside, and in which the entities' domestic ultimate and global ultimate reside are checked against this list. If one or more of these countries is on the sanctioned list, a weight of 50 is assigned. Also, certain industries are considered to have an elevated compliance risk. If a party has activities in an industry that appears on the list of high risk industries in Sec. 6.3, then an appropriate weight is assigned. This and other subsidiary data is preferable automatically updated on a periodic basis.

The currently most preferred embodiment of the CR metric uses the weights and data elements described in Sec. 6.1.

In further embodiments of the CR metric, the data elements weighted and their weights may be changed, for example, on the basis of observed results by methods known in the art, the use of logistic regression, and also the use of other known statistical classification and pattern recognition methods where observed results indicate that inadequacy of such linear discriminant functions. Alternatively, other techniques of pattern recognition may supplement or replace the current discriminant analysis. For example, rules based methods such as expert systems may be used. Also clustering techniques such as neural networks may be applied. Still further embodiments can determine risk indices suitable to the requirements of other statutes, regulations, and policies that are similar to the USAPA. The statutes and regulations are usually established by a government, while policies are often established by user organizations themselves, and are generally referred to herein as "know-your-customer" requirements or risks. In these further embodiments, the data elements selected and the weights assigned determined are adapted to reflect these differing requirements. For example, the policies of a commercial user organization may place higher weights on an entities payment history and lower weights on the residence countries of related entities.

Finally, the CR risk index class is designed to provide a quick risk overview of USAPA risk. It includes at least two risk classes which are assigned in dependence on the CR risk metric, optionally further combined with the POR metric. The currently preferred embodiment assigns one of three risk classes according to the following table.

| Compliance Risk Index Values | Compliance Risk Index Class |
| --- | --- |
| Less than or equal to 54 | Low |
| 55-67 | Medium |
| Greater than or equal to 68 | High |

Once all three metrics, the POR, the CR risk index, and the CR risk class, are determined for a party or entity, the are returned 29 for further processing according to the method of FIG. 1.

Returning to FIG. 1, these risk metrics are now used to prepare customer identification responses 13. For request transactions, the risk metrics and selected supporting data for the identified party are suitably formatted for screen display and transmitted to the user by known online communication means. For request batches, corresponding data for the usually numerous requested party identification are formatted into reports and transmitted to the user.

Figure 3C:
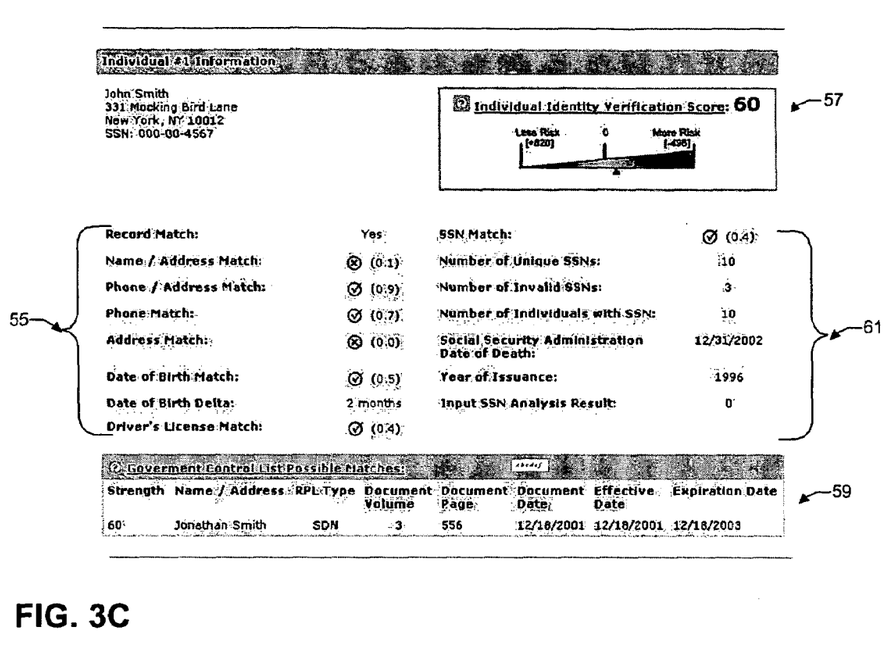
FIG. 3 illustrates exemplary requests and responses.

FIGS. 3A-C illustrate typical response data provided for a request transaction. The reports responding to request batch include similar data and are described subsequently. First, FIG. 3A illustrates party identity confirmation overview data for the example party Abcdef Manufacturing Co.

of San Francisco, Calif. Header information includes the party name and address preferably as supplied in the user request. To the left, item 41 provides information about potential matches to government control lists, such as the U.S. Treasury Office of Foreign Asset Compliance (http://www.ustreas.gov/offices/eotffc/ofac/; last visited May 27, 2004) terrorist list. Here, Abcdef potentially matched to four such lists. On the right, item 43 shows whether or not party identity has been confirmed, and of so, the party's POR, here 5. This value provides indication of identity confirmations by third parties. Item 45 shows the CR risk metric value, here 34, and the risk metric class, here "low". This value and class provide insight based on the attributes of this trading partner, such as: line of business age & size location controlling interest (for example, the parent company) level of trading activity, and further identity authentication by third parties.

FIG. 3B illustrates some of the data elements from which the previous-screen's risk metrics have been derived. On the left, item 47 indicates whether or not the party is still active at the requested location. Also on the left, item 49 provides a selection of the relevant business and commercial data elements. On the right, item 51 provides information about the upward controlling interest entities of the identified party and where they are located. This information is important if one of these entities resides in a US Treasury sanctioned country or FATF non-cooperative country or territory. And item 53 provides detail about the potential matches to the government control lists, for example here the particular list matched, the effective date of the list, and expiration date of the particular entry that was matched.

FIG. 3C illustrates the data provided for an individual identity confirmation. Header information includes the party name, address, and social security number supplied in the user request. Item 57 is the identity confirmation score which provides a summary value indicating whether the identity information for this individual, for example a signatory, or a principal, or a guarantor, is inconsistent and may represent elevated risk. Here, a score of 60 represents "medium" risk. Item 55 on the left summarizes how closely this individual's identification data elements match. Here, for example, the retrieved data indicates inconsistent name and address information from the various information services. Item 61 on the right evaluates and presents inconsistencies in the social security number(s) potentially associated with the identified individual. Finally, item 59 then presents potential matches against government control lists, again along with the particular list matched, the effective date of the list, and expiration date of the particular entry that was matched.

For batch processing, the risk metrics are returned in the user response reports along with a selectable number (optionally, depending on risk class) of the data elements from which the risk metrics were determined. For example, data elements which may be selected for the user response include: country codes (in ISO 2 byte alpha format); primary SIC type (describes the type of code used in a particular country); local activity code (for US records this will represent the primary SIC 8); local activity code type; local business ID (for US records this will be represented by the FEIN number where available); registration type; history indicator; import indicator (Y or N indicators); export indicator (Y or N indicators); principal name & title; total trade payments (a sum of all trade references available on the site DUNS); suits/judgment indicator; financial embarrassment indicator (whether record of an open or closed bankruptcy, receivership liquidation, discontinuance with unpaid obligations or an equivalent event related to the company exists in the D&B database); debarments count (for US records this will be presented as a Y or blank indicator); headquarter & parent information; branch/status indicator (indicates whether the subject business is a branch, or headquarters, or single location); business structure/subsidiary indicator (a value of Y indicates subsidiary; a value of N indicates not a subsidiary); and severe risk indicator (for US records, indicates high risk or business deterioration)

Additionally, the user may preferably select one or more selectable reports summarizing the input batch request. The parties response in these reports can be sorted on various fields including: the CR risk class, party name, party identifier (such as the DUNS number). Each report preferably contains certain common data elements including (when available): batch transaction number, sequence number, DUNS number, user account identifier, user account name, Dun & Bradstreet name of the business party, party's business address {city/state/country}, the POR, the CR risk index, and the CR risk class.

Optional reports include the following. An industry risk report identifies entities with a CR risk class of medium or high and whose line of business represents a greater exposure to compliance risk. The selection criterion for the report is based on the CR risk class and primary SIC of the business, matched against the higher risk industries list. The primary SIC is displayed for each record.

A time in business report identifies entities with a CR risk class of medium or high and a greater exposure to compliance risk based on the amount of time present management has been in control. The selection criterion for the report is based on the CR risk class and the control year of the business. Businesses with a control year under 3 years old are displayed on this report. The control year is displayed for each record.

A sanctioned countries report identifies entities a greater exposure to compliance risk based on one or more of the following being located within a sanctioned country: the subject entity, headquarters of the entity, parent of the entity, domestic ultimate of the entity, or global ultimate of the entity. The selection criterion for the report is based on the country codes of the aforementioned corporate family tree members. The Country Codes for the subject entity, headquarters, parent, domestic ultimate or global ultimate are displayed for each record.

A severe risk report identifies entities a greater exposure to compliance risk based on being designated as a confirmed higher risk record. Higher risk designation is assigned when an entity displays characteristics of fraud, has misrepresented data to information services (such as Dun & Bradstreet), or has undergone criminal indictment.

A government control list potential match report identifies entities which potentially match to one or more potential GCLs, and thus represent a greater compliance risk. The selection criterion for the report is based on the presence of one or more match candidates. This report contains the number of matches.

An unauthenticated business report identifies entities a greater exposure to compliance risk based on the failure to meet qualifications as an authenticated business. The selection criterion for the report is a POR of zero, that is the absence of all of the following data: incorporation year, total payments (>0), financial embarrassment indicator, out of business indicator, suit(s) and/or judgment(s) indicator, claim(s) indicator, secured filings indicator, 8(*a*) firms indicator, and debarments count.

A compliance risk Index summary report provides an overview of the CR risk metric distribution across an entire customer portfolio of identification requests. Preferably, this report includes a histogram of CR risk metric values in 5% bins as well as the average CR risk metric value and the modal CR risk metric value.

A medium-high CR risk class report identifies entities with a greater exposure to compliance risk. The selection criterion for the report is based on the Compliance Risk Index Class. And an out of business report identifies entities with a greater exposure to compliance risk based on information indicating that the party is out of business.

Figure 4:
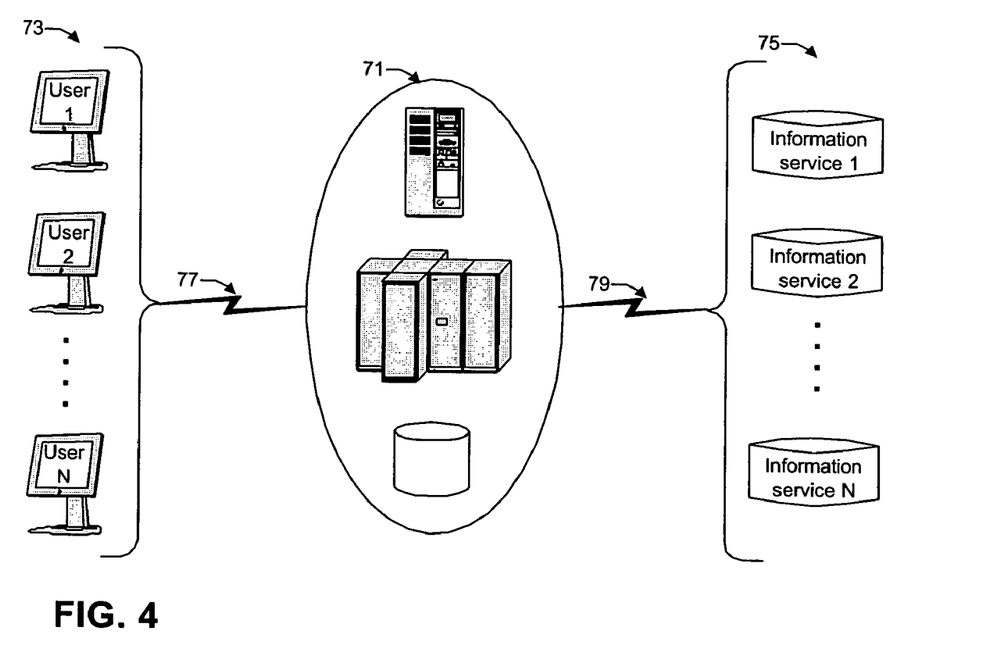
FIG. 4 illustrates systems of this invention.

Finally, as will be apparent to one of ordinary skill in the art, the methods described above can be implemented on a wide variety of computer systems having certain basic processing and communication components. FIG. 4 illustrates an exemplary such system. It includes processing complex 71, which actually performs these methods, have a variety of structures. It can includes one or more processors, either workstations, servers, or mainframes. It also includes sufficient online storage at least to store transaction and batch requests in process.

As described work is submitted to 71 by users 73 (not part of the system) using transaction-oriented input, or batch oriented input, or other input means. Thus a system of his invention includes communication network links 77 to the uses. Also since, as described, the system consults external information sources 75, it includes communication network links 79 to the external system of these information sources. Network links 77 and 79 may be separate or joint, as for example, the public Internet.

Finally, this invention includes machine readable media, and products with such machine readable media, containing computer code for causing computer systems to perform the methods of this invention Such physical media and products are known in the art.

6. Supplementary Information

Certain details of the currently preferred embodiments are presented in the following supplementary sections.

6.1 Compliance Risk Rules

This appendix describes the currently most preferred embodiment of the compliance risk (CR) metric as a table of rules for assigning index values. The values individually assigned by each rule are summed to determine the resulting CR metric.

| FIELD NAME | COMPLIANCE ALGORITHM |
| --- | --- |
| PHYSICAL COUNTRY | If fair-haven or sanctioned-country set to 50. |
| TOTAL EMPLOYEES | If < than 500 set to 1; if <100 set to 2;, if <10 set to 3; if null set to 5 (Note: "<" (">") signifies a value less (greater) than) |
| EMPLOYEES HERE | If < than 100 set to 1; if <25 set to 2; if <10 set to 3; if null set to 5 |
| PRIMARY SIC | If HR SIC set to 15 (use base-4 SIC for non-US records) |
| LOCAL ACTIVITY CODE | If HR SIC set to 15 |
| CONTROL YEAR | If <3 yrs old set to 3; if <2 years set to 5; if less than 1 year set to 10 |
| INCORPORATION YEAR | If not available (N.A.) set to 5 |
| SITE OWNERSHIP | If owns set to 0; if rents/lease set to 5 |

-continued

| FIELD NAME | COMPLIANCE ALGORITHM |
| --- | --- |
| HISTORY INDICATOR | If set to incomplete set to 5; if set to "Bus" or "Mgmt" set to 20 |
| IMPORT INDICATOR | If Y set to 5 |
| EXPORT INDICATOR | If Y set to 5 |
| PROOF OF RIGHT COUNT | If 0, set to 20; if 1 set to 10; if 2 set to 5 |
| TOTAL TRADE PAYMENTS | If <2 or blank set to 10; if <10 set to 5; if <25 set to 2 |
| HIGH CREDIT | If <$10K or blank set to 5; if <$50K set to 3; if <$100K set to 1 |
| AVG CREDIT | If <$1K or blank set to 5; if <$5K set to 3; if <$10K set to 1 |
| SECURED FILINGS INDICATOR (UCC INDICATOR) | If N.A set to 1 |
| SUITS/JUDGMENTS INDICATOR | if Y set to 2 |
| CLAIMS INDICATOR (LIENS) | If Y set to 2 |
| ANNUAL SALES VOLUME | If <$1 M set to 10; if SLS/TOT_EMPL <$100K set to 10 |
| PAYDEX SCORE | If PAYDEX = N/A set to 2; if PAYDEX <30 set to 5; if PAYDEX is >30 and <50 set to 3 |
| STATEMENT DATE | If N.A. set to 5 |
| FINANCIAL EMBARASSMENT INDICATOR | If Y set to 10 |
| OTHER SPECIAL EVENT | If Y set to 10 |
| OPERATING SPECIAL EVENT | If Y set to 10 |
| CRIMINAL ACTIVITY | If Y set to 50 |
| DISASTER SPECIAL EVENT | If Y set to 10 |
| FINANCIAL/LEGAL SPECIAL EVENT | If Y set to 10 |
| DEBARMENTS COUNT | If >0 set to 50 |
| HDQ COUNTRY CODE | If sanctioned country set to 50 |
| PARENT COUNTRY CODE | If sanctioned country set to 50 |
| DOMESTIC ULT COUNTRY CODE | If sanctioned country set to 50 |
| GLOBAL ULT COUNTRY CODE | If sanctioned country set to 50 |
| OUT-OF-BUSINESS INDICATOR | If Y set to 50, if OUT_BUS_IND is Y and TOT_PMT is 0 set to 75 |
| SEVERE RISK INDICATOR | If "HR" set to 70 |

Compliance Risk Index Note:
If more than one of the following locations is listed in a sanctioned country (site, headquarters, parent, domestic ultimate or global ultimate), then only 50 points is assigned.

6.2 Sanctioned and Non-Cooperating Countries

Currently sanctioned and non-cooperating countries for the purposes of the compliance risk index rules include: Angola, Burma (Myanmar), Cook Islands, Cuba, Egypt, Estonia, Guatemala, Indonesia, Iran (Islamic Republic Of), Iraq, Korea (Democratic People's Republic Of), Liberia, Libyan Arab Jamahiriya, Lithuania, Latvia, Nigeria, Philippines, Sierra Leone., Saint Vincent, Sudan, and Yugoslavia. An entity having an associated location in one of these countries has a higher compliance risk than if no associated location are so located.

6.3 Higher Risk Industries

Industries currently considered higher risk for the purposes of the compliance risk index rules include. This list is grouped in alphabetical order.

Industries A-B: accounting machines using machine readable programs; administrator of private estates, nonoperating; aeronautical equipment and supplies; agencies of foreign banks; agents, farm or business loan; agents, shipping; agreement corporations; agricultural credit institutions; agricultural loan companies; air cargo carriers, nonscheduled; air passenger carriers, nonscheduled; air taxis; air transportation, nonscheduled; air transportation, nonscheduled; air transportation, nonscheduled, nec; aircraft; aircraft and parts; aircraft and parts, nec; aircraft and space vehicle supplies and parts; aircraft dealers; aircraft engines and engine parts; aircraft equipment and supplies, nec; aircraft instruments, equipment or parts; aircraft, nec; aircraft, self-propelled; airline ticket offices; airplanes, fixed or rotary wing; airships; amateur radio communications equipment; amatols (explosive); ambulance services, air; ammunition; ammunition, except sporting; antique automobiles; antistatic equipment and devices; arrangement of travel tour packages, wholesale; assessment life insurance agents; autogiros; automated clearinghouses; automated teller machine (ATM) network; automobile and consumer finance companies; automobile auction; automobile finance leasing; automobile loans, including insurance; automobiles; automobiles, new and used; automobiles, used cars only; automotive brokers; automotive dealers, nec; automotive dealers, nec; automotive dealers, nec, nec; balloons, hot air (aircraft); banks for cooperatives; benevolent insurance associations; biological laboratory; biological products, except diagnostic; biological products, except diagnostic, nec; biological research; biological stains; biologicals and allied products; biotechnical research, commercial; black powder (explosive); blimps; boats, canoes, watercrafts, and equipment; boats, non-recreational; bond and mortgage companies; bond dealers and brokers; bondholders protective committee; brokers' services; brokers, business: buying and selling business enterprises; brokers, farm or business loan; brokers, security; brokers, shipping; bullion, precious metals; burial insurance societies; bus ticket offices; business credit institutions; buying of installment notes.

Industries C-E: calculators, electronic; capacitors, electronic; carpool/vanpool arrangement; casino hotel; cassettes, recording; cathode ray picture tubes; charitable trust management; check cashing agencies; check clearing services; citizens band radios; clearinghouse associations, bank or check; closed circuit TV; coils, electronic; coins; coins, medals, and trophies; combat vehicles; commercial banks, nec; commercial vehicles; commodity brokers, contracts; commodity contract exchanges; commodity contract pool operators; commodity contract trading companies; commodity contracts brokers, dealers; commodity contracts brokers, dealers; commodity contracts brokers, dealers, nec; commodity credit corporation; commodity dealers, contracts; commodity investors; commodity traders, contracts; communication equipment; computer peripheral equipment; computer software; computers and accessories, personal and home entertainment; computers, nec; computers, peripherals, and software; computers, peripherals, and software, nec; condensers, electronic; connectors, electronic; consumer finance companies; cooperative life insurance organizations; cordite (explosive); credit card services, central agency collection; credit unions; customhouse brokers; customs clearance of freight; cyclonite, RDX; dealers, security; deposit brokers; detonators and detonating caps; detonators, high explosives; diamond setter; diamonds (gems); diazodinitrophenol, DDNP; diodes; direct working capital financing; dirigibles; disk drives; diskettes, computer; distributors, security; domestic freight forwarding; dunebuggies; dynamite; edge act corporations; educational trust management; electrical entertainment equipment; electronic funds transfer network, including switching; electronic parts; electronic parts and equipment, nec; electronic parts and equipment, nec, nec; electronic tubes: receiving and transmitting, or industrial; emulsions (explosive); equipment and vehicle finance leasing companies; escrow institutions other than real estate; ethylene glycol dinitrate, EGDN; exchange clearinghouses, commodity; exchange clearinghouses, security; explosive cartridges for concussion forming of metal; explosives; explosives; export/import bank.

Industries F: face amount certificate issuing; face amount installment certificate issuing; facsimile equipment; factoring services; factors of commercial paper; farm mortgage companies; farmers home administration; federal and federally sponsored credit; federal and federally sponsored credit agencies; federal and federally sponsored credit, nec; federal credit unions; federal home loan mortgage corporation; federal intermediate credit bank; federal land banks; federal mortgage credit agencies; federal national mortgage association; federal savings and loan associations; federal savings banks; federal savings institutions; federal savings institutions, nec; fiduciary agencies other than real estate or trust; finance leasing, vehicles: except automobiles and trucks; financial reporting; financing of dealers by motor vehicle manufacturers organ.; financing: automobiles, furniture, etc., not a deposit bank; firearms; firearms and ammunition, except sporting; firearms, except sporting; firearms, sporting; floor traders, security; flotation companies; flying charter service; foreign bank and branches and agencies; foreign bank and branches and agencies; foreign bank and branches and agencies, nec; foreign currency exchange; foreign freight forwarding; foreign trade and international banks; foreign trade and international banks, nec; fraternal life insurance organizations; fraternal protective associations; freight consolidation; freight forwarding; freight rate information service; freight transportation arrangement; freight transportation arrangement; freight transportation arrangement, nec; functions closely related to banking; functions related to deposit banking; functions related to deposit banking, nec; funeral insurance; fuse powder; fuses, safety; futures advisory service; futures brokers and dealers, commodity; futures exchanges, contract;

Industries GL: general and industrial loan institutions; gliders (aircraft); gliders, except hang; go-carts; government national mortgage association; government national mortgage association (GNMA) pools; guided missiles and space vehicles; gunpowder; helicopter carriers, nonscheduled; helicopter parts; helicopters; high fidelity equipment; HMX, HBX; hot air balloons and equipment; hunting equipment; industrial loan banks and companies, not a deposit bank; installment paper; installment sales finance, other than banks; insurance carriers; intercommunication equipment, electronic; intercommunication equipment, electronic; intermediate investment banks; investment advice; investment advice, nec; investment advisory service; investment bankers; investment certificate sales; investment clubs; investment counselors; investment firm, general brokerage; investment offices; investment offices, nec; investment offices, nec, nec; investment research; investors syndicates; investors, nec; investors, nec, nec; jewelry and precious stones; jewelry and precious stones, nec; jewelry repair services; jewelry sales, house-to-house; jewelry stores; jewelry stores, nec; jewelry, mail order; jewelry, precious stones and precious metals; keying equipment; lead azide (explosive); lead styphnate (explosive); legal reserve life insurance; licensed loan companies, small; life insurance; life insurance; life insurance carriers; life insurance funds, savings bank; life insurance, nec; life reinsurance carriers; livestock loan companies; loan agents; loan brokers; loan brokers, nec; loan correspondents.

Industries M-N: machine guns; machinery and equipment finance leasing; magnetic recording tape; mainframe computers; management investment funds, closed-end; management investment, open-end; management investment, open-end, nec; manager of mutual funds, contract or fee basis; marine crafts and supplies; marine propulsion machinery and equipment; marine supplies; medallions; mercantile financing; mercury fulminate (explosive); mineral leasing dealers; mineral royalties dealers; mineral, oil, and gas leasing and royalty dealers; miscellaneous business credit institutions; miscellaneous business credit institutions, nec; miscellaneous investing; mobile telephone equipment; modems, computer; money market mutual funds; money order issuance; Morris plans, not a deposit bank; mortgage bankers; mortgage bankers and brokers; mortgage bankers and correspondents, nec; mortgage bankers and loan correspondents; mortgage brokers arranging for loans, using money of others; mortgage brokers, using own money; mortgage companies, urban; mortgage investment trusts; mortgages, buying and selling; motorboats; motorized aircraft; mutual association credit agencies; mutual association life insurance; mutual benefit associations; mutual fund sales, on own account; mutual funds, selling by independent salesperson; national commercial banks; national commercial banks, nec; national consumer cooperative bank; national trust companies with deposits, commercial; navigation equipment and supplies; new and used car dealers; new and used car dealers; new and used car dealers, nec; nitroglycerin (explosive); nitromannitol (explosive); nitromethane, NM (explosive); nitrostarches (explosive); nitrosugars (explosive); nondeposit trust facilities; nondepository credit institutions; nonmotorized and lighter-than-air aircraft; nonscheduled charter services; note brokers.

Industries O-R: oil and gas lease brokers; oil leases, buying and selling on own account; oil royalties dealers; oil royalty traders; oil royalty traders, nec; paging and signaling equipment; pari-mutuel totalization equipment finance leasing and maint.; passenger transportation arrangement; passenger transportation arrangement, nec, nec; pentaerythritol tetranitrate, PETN personal credit institutions; personal credit institutions; personal credit institutions, nec; personal finance licensed loan companies, small; personal investment trust management; pickups and vans, used; pickups, new and used; plastic explosives; precious metal mill shapes; precious metals; precious stones (gems), nec; precious stones and metals; primary explosives, fuses and detonators; printers, computer; private estate, personal investment and vacation fund trusts; production credit association, agricultural; protective committees; public address equipment; purchase and sale of trust deeds; purchasers of accounts receivable and commercial paper; radar detectors; radio and television equipment and parts; radio parts and accessories, nec; radio receiving and transmitting tubes; radios, motor vehicle; radios, nec; railroad freight agency; railroad ticket offices; real estate investment trusts; real estate investment trusts, nec; real estate investors, except property operators; realty investment trusts; rectifiers, electronic; regional clearinghouse associations; religious trust management; remedial loan societies; representative foreign bank offices, ex. agents and branches; resistors, electronic; royalty owners protective associations; rural electrification administration.

Industries S: safe deposit companies; savings and loan associations, not federally chartered; savings institutions; savings institutions, except federal; savings institutions, except federal, nec; secondary high explosives; securities flotation companies; security & commodity brokers, dealers, exchanges & services; security and commodity clearinghouses; security and commodity exchanges; security and commodity exchanges; security and commodity exchanges, nec; security and commodity service; security and commodity services; security and commodity services, nec, nec; security brokers and dealers; security brokers and dealers; security brokers and dealers; security brokers and dealers, nec; security control equipment and systems; security custodians; security exchanges; security holders protective committee; security speculators for own account; security transfer agents; semiconductor devices; shipping documents preparation; ships; short-term business credit institutions, except agricultural; short-term business credit, nec; sightseeing airplane service; sightseeing tour companies; slurries (explosive); small business investment companies; snowmobiles; sound equipment, electronic; space propulsion units and parts; sporting powder (explosive); squibbs, electric; state commercial banks; state commercial banks, nec; state credit unions; state credit unions, nec; state credit unions, not federally chartered; state savings banks, not federally chartered; state trust companies accepting deposits, commercial; steamship ticket offices; stock brokers and dealers; stock exchanges; stock option dealers; stock option exchanges; stock quotation service; stock transfer agents; student loan marketing association; syndicate shares (real estate, entertainment, equip.) sales; synthetic fuels corporation; tanks and tank components.

Industries T-Z: tape players and recorders; tapes, audio and video recording; tax certificate dealers; tax certificate sale and redemption agencies; tax liens: holding, buying and selling; telegraph equipment; telephone and telegraphic equipment; telephone equipment; teletype equipment; television receiving and transmitting tubes; television sets; terminals, computer; ticket offices, transportation, nec; TNT and DNT, trinitrotoluene and dinitrotoluene; tour operators; tour operators, nec; tourist agency arranging transport, lodging and car rental; tours, conducted; traders, security; transformers, electronic; transistors; transmitters; transport clearinghouse; transportation agents and brokers; transportation equipment and supplies, nec; transportation ticket offices; travel agencies; travel agencies, nec; travelers' checks issuance; truck finance leasing; truck transportation brokers; trucks, noncommercial; trucks, tractors, and trailers: new and used; trucks, tractors, and trailers: used; trusts; trusts, except educational, religious, charity: management; trusts, nec; trusts, nec, nec; trusts: educational, religious, etc.; trusts: educational, religious, etc., nec; TV parts and accessories, nec; underwriters, security; unit investment trusts; used car dealers; used car dealers; used car dealers, nec; vacation funds for employees; vans, new and used; vans, noncommercial; venture capital companies; video camera-audio recorders (camcorders); video cassette recorders and accessories; video equipment, electronic; water gels (explosive); well shooting torpedoes (explosive); word processing equipment; working capital financing; yacht brokers.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

A number of references are cited herein, the entire disclosures of which are incorporated herein, in their entirety, by reference for all purposes. Further, none of these references, regardless of how characterized above, is admitted as prior to the invention of the subject matter claimed herein.

What is claimed is:

1. A method comprising:
assembling a plurality of data elements descriptive of risk characteristics of a designated customer, wherein at least one data element is descriptive of risk characteristics determined by a government, and wherein the assembled data elements comprises at least ten data elements selected from the group consisting of physical country, total employees, employees here, primary SIC, local activity code, control year, incorporation year, site ownership, history indicator, import indicator, export indicator, count of independent proofs of identity, total trade payments, high credit, average credit, secured filings indicator, suits/judgments indicator, claims indicator or liens, annual sales volume, PAYDEX score, statement date, financial embarrassment indicator, other special event, operating special event, criminal activity, disaster special event, financial/legal special event, debarments count, headquarters country code, parent country code, domestic ultimate country code, global ultimate country code, out-of-business indicator, severe risk indicator, and one or more data elements each indicating a presence or absence on a government control list;
weighting a selected plurality of the assembled data elements with a weight relative to a risk indicated by values of the assembled data elements; and
combining the weighted data elements into one or more indices representative of a know-your-customer risk of the designated customer,
wherein the assembled data elements and the weights are selected so that the one or more indices are representative of United States Patriot Act compliance risk.

2. The method of claim 1, wherein numerical weights are assigned in dependence on the values of a plurality of the data elements, and the assigned weights are combined by adding the values.

3. The method of claim 1, wherein at least one weight is assigned in dependence on an activity of the designated customer being in an identified higher risk industry.

4. The method of claim 1, wherein at least one weight is assigned in dependence on a location associated with the designated customer being on a list established by a government of higher risk countries.

5. The method of claim 1, wherein at least one data element indicating a presence or absence of the designated customer on a list established by a government of higher risk entities.

6. The method of claim 1, wherein the weighting comprises choosing relative weights for the selected plurality of assembled data elements such that physical country has a relative weight of 50 or less, total employees has a relative weight of 5 or less, employees here has a relative weight of 5 or less, primary SIC has a relative weight of 15 or less, local activity code has a relative weight of 15 or less, control year has a relative weight of 10 or less, incorporation year has a relative weight of 5 or less, site ownership has a relative weight of 5 or less, history indicator has a relative weight of 20 or less, import indicator has a relative weight of 5 or less, export indicator has a relative weight of 5 or less, proof of right count has a relative weight of 20 or less, total trade payments has a relative weight of 10 or less, high credit has a relative weight of 5 or less, average credit has a relative weight of 5 or less, secured filings indicator has a relative weight of 1 or less, suits/judgments indicator has a relative weight of 2 or less, claims indicator or liens has a relative weight of 2 or less, annual sales volume has a relative weight of 10 or less, PAYDEX score has a relative weight of 5 or less, statement date has a relative weight of 5 or less, financial embarrassment indicator has a relative weight of 10 or less, other special event has a relative weight of 10 or less, operating special event has a relative weight of 10 or less, criminal activity has a relative weight of 10 or less, disaster special event has a relative weight of 10 or less, financial/legal special event has a relative weight of 10 or less, debarments count has a relative weight of 50 or less, headquarters country code has a relative weight of 50 or less, parent country code has a relative weight of 50 or less, domestic ultimate country code has a relative weight of 50 or less, global ultimate country code has a relative weight of 50 or less, out-of-business indicator 75, and severe risk indicator has a relative weight of 70 or less.

7. The method of claim 1, at least one determined index is representative of overall risk of the designated customer, wherein the overall risk is determined by combining a majority of the weighted, assembled data elements.

8. The method of claim 1, further comprising:
receiving a user request for risk assessment of one or more designated customers, and returning to the user the determined risk indices for each designated customer.

9. The method of claim 1, wherein at least one weight is assigned in dependence on an activity of the designated customer being in an identified higher risk industry, and at least one weight is assigned in dependence on a location associated with the designated customer being on a list established by a government of higher risk countries, and at least one data element indicating a presence or absence of the designated customer on a list established by a government of higher risk entities.

10. The method of claim 1, wherein at least one determined index is representative of a certainty of identification of the designated customer.

11. The method of claim 10,
wherein the assembled data elements comprises at least four data elements selected from the group consisting of incorporation year data, total trade payment data, financial embarrassment data, secured filings indicator data, suits/judgments indicator data, claims indicator data, positive 8(a) firm indicator data, and debarments count data, and
wherein the index that is representative of the certainty of identification of the designated customer equals a number of values for at least four data elements selected from the group consisting of incorporation year data, total trade payment data, financial embarrassment data, secured filings indicator data, suits/judgments indicator data, claims indicator data, positive 8(a) firm indicator data, and debarments count data.

12. The method of claim 10, wherein the index that is representative of the certainty of identification of the designated customer increases as a number of data elements with values requiring positive identification of the designated customer increases.

13. A product comprising a computer readable medium having encoded instructions for causing a computer system to perform the method of claim 1.

14. A system for know-your-customer risk assessment comprising: facilities configured to communicate with a plurality of information services, and a processor operatively coupled with the facilities for performing the steps of
  (i) communicating to at least one information service a query for data elements concerning a designated customer,
  (ii) assembling a plurality of data elements communicated from the information services descriptive of risk characteristics of the designated customer, wherein at least one data element is descriptive of risk characteristics determined by a government, and wherein the assembled data elements comprises at least ten data elements selected from the group consisting of physical country, total employees, employees here, primary SIC, local activity code, control year, incorporation year, site ownership, history indicator, import indicator, export indicator, count of independent proofs of identity, total trade payments, high credit, average credit, secured filings indicator, suits/judgments indicator, claims indicator or liens, annual sales volume, PAYDEX score, statement date, financial embarrassment indicator, other special event, operating special event, criminal activity, disaster special event, financial/legal special event, debarments count, headquarters country code, parent country code, domestic ultimate country code, global ultimate country code, out-of-business indicator, severe risk indicator, and one or more data elemements each indicating a presence or absence on a government control list;
  (iii) weighting each of the assembled data elements with a weight relative to a risk indicated by values of the assembled data elements; and
  (iv) combining the weighted data elements into one or more indices representative of a know-your-customer risk of the designated customer,
  wherein the assembled data elements and the weights are selected so that the one or more indices are representative of United States Patriot Act compliance risk.

15. The system of claim 14, further comprising facilities configured to communicate with at least one user, and wherein the processor further receives a user request for risk assessment of one or more designated customers, and returns to the user the determined risk indices for each designated customer.

16. The system of claim 15, wherein at least one user request is received as a request transaction, and wherein a response transaction comprising one or more data screens is returned to the user.

17. The system of claim 14, wherein the data elements assembled and the weightings of selected plurality of the assembled data elements are selected so that the one or more indices are representative of United States Patriot Act compliance risk.

18. The system of claim 14, wherein the processor assigns numerical weights in dependence on the values of a plurality of the data elements, and combines the assigned weights by adding the values.

* * * * *